Dec. 8, 1925. Re. 16,223

J. N. MAHONEY ET AL

ELECTRICAL SYSTEM

Original Filed Aug. 30, 1916

WITNESSES:
A. G. Schiefelbein
J. E. Foster

INVENTORS
Joseph N. Mahoney and
Walter M. Austin.
BY
Uberley G. Barr
ATTORNEY

Reissued Dec. 8, 1925. Re. 16,223

UNITED STATES PATENT OFFICE.

JOSEPH N. MAHONEY, OF BROOKLYN, NEW YORK, AND WALTER M. AUSTIN, OF WILKINSBURG, PENNSYLVANIA, ASSIGNORS TO WESTINGHOUSE ELECTRIC AND MANUFACTURING COMPANY, A CORPORATION OF PENNSYLVANIA.

ELECTRICAL SYSTEM.

Original No. 1,363,666, dated December 28, 1920, Serial No. 117,666, filed August 30, 1916. Application for reissue filed October 21, 1921. Serial No. 509,415.

*To all whom it may concern:*

Be it known that we, JOSEPH N. MAHONEY, a citizen of the United States, and a resident of Brooklyn, in the county of Kings and State of New York, and WALTER M. AUSTIN, a citizen of the United States, and a resident of Wilkinsburg, in the county of Allegheny and State of Pennsylvania, have invented a new and useful Improvement in Electrical Systems, of which the following is a specification.

Our invention relates to electrical systems and devices and particularly to means for automatically connecting feeder circuits together, under predetermined conditions.

One object of our invention is to provide a system of the above-indicated character that shall have means dependent upon the sum of the voltages of the circuits that are to be connected together for controlling the opening and closing of the connection between the same.

Another object of our invention is to provide means whereby the limiting resistance, that is connected in series with the actuating and holding windings of the connecting circuit interrupter, is adapted to be short circuited only when the interrupter is being closed.

In the carrying out of our invention, we provide a circuit interrupter for operatively connecting two feeder circuits together and means for so controlling the interrupter that the circuits will be connected together only when the sum of the voltages on the two circuits exceeds a predetermined value. Means is also provided whereby the limiting resistor, that is connected in series with the actuating winding of the interrupter, is adapted to be short-circuited only when the interrupter is in open position and is being closed. Thus, only a relatively small current traverses the actuating winding when the interrupter is in its closed position.

If a short circuit or other abnormal condition occurs on a section and reduces the voltage thereof, the interrupter will automatically open and will remain open until predetermined normal voltage conditions are established.

Figure 1:
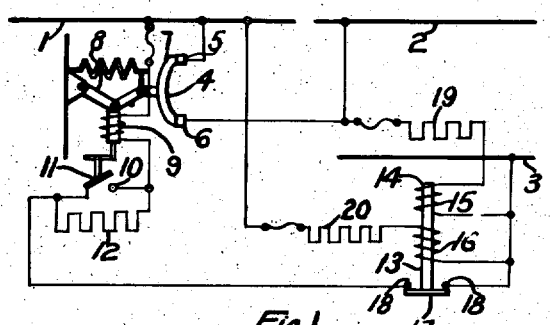

Figure 1 of the accompanying drawings is a diagrammatic view of an electrical circuit embodying our invention, and Figs. 2, 3, 4, 5 and 6 are diagrammatic views of electrical circuits embodying modified forms of our invention.

Two feeder conductors 1 and 2, having a common return conductor 3, are adapted to be operatively connected together by a circuit interrupter 4 when the sum of the voltages between the feeder conductors and the common return conductor exceeds a predetermined value.

In Fig. 1 of the drawings, the circuit interrupter 4 comprises main stationary contact members 5 and 6, a main bridging contact member 7, a toggle mechanism 8, an actuating electromagnet 9, an auxiliary stationary contact member 10, an auxiliary movable contact member 11 and a limiting resistor 12. A relay 13, comprising a movable core member 14, two windings 15 and 16, a movable bridging contact member 17 and stationary contact members 18, is provided for the purpose of controlling the circuit of the actuating electromagnet 9. One terminal of the winding 15 is connected through a resistor 19, to the feeder conductor 2, and the other terminal of the winding 15 is connected to the conductor 3. One terminal of the winding 16 is connected, through a resistor 20 to the conductor 1 and the other terminal of the winding 16 is connected to the common return conductor 3.

The windings 15 and 16 of the relay 13 are so proportioned that the movable bridging contact member will engage the stationary contact members 18 only when the sum of the voltage drops between the feeder conductors 1 and 2 and the common return conductor 3 exceeds a predetermined value. When this occurs, current is permitted to traverse the winding of the electromagnet 9, and the circuit interrupter 4 is closed. The contact members 10 and 11 constitute the separable terminals of a short-circuit connection across the terminals of the resistor 12 and are so arranged that, when the circuit interrupter 4 is closed, they are disengaged to thereby limit the current that traverses the winding of the electromagnet 9.

Figure 2:
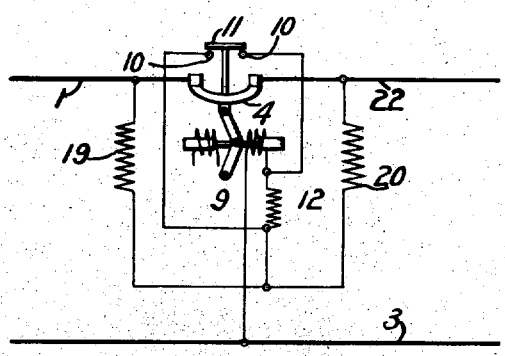

In Fig. 2 of the drawings, the winding of the actuating electromagnet 9 is connected in series with the limiting resistor 12 and the circuit, thus constituted, is so connected to two resistors 19 and 20 that the winding of the electromagnet 9 will be supplied with current proportional to the sum of the voltage drops across the feeder conductors 1 and 2 and the common return conductor 3. The circuit interrupter 4 is provided with an auxiliary movable contact member 11 that is adapted to engage auxiliary stationary contact members 10 for the purpose of short-circuiting the resistor 12 when the circuit interrupter 4 is in its open position, thereby permitting sufficient current to traverse the winding of the electromagnet 9 to actuate the circuit interrupter 4 when the sum of the voltage drops is a predetermined value.

Figure 3:
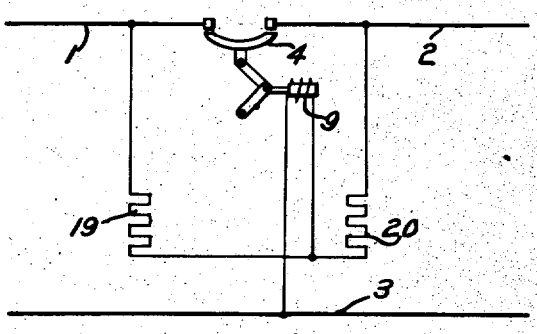

In Fig. 3 of the drawings, one terminal of the winding of the actuating electromagnet 9 of the circuit interrupter 4 is connected to one terminal of the resistors 19 and 20 and its other terminal is connected to the conductor 3. The other terminals of the resistors 19 and 20 are connected to the conductors 1 and 2, respectively. With such an arrangement, the winding of the electromagnet 9 is supplied with current proportional to the sum of the voltage drops across the feeder conductors 1 and 2 and the return conductor 3, but no means is provided for limiting the amount of current that traverses the winding of the electromagnet 9 when the circuit interrupter 4 is in its open or in its closed position.

Figure 4:
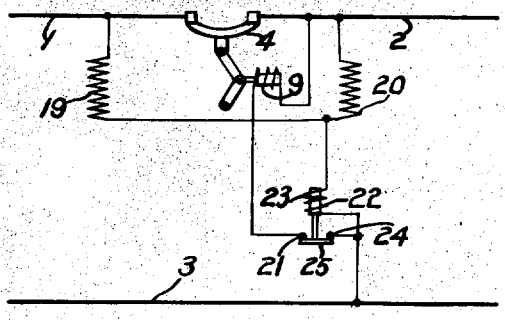

In Fig. 4 of the drawings, one terminal of the winding of the electromagnet 9 is connected to the conductor 2 and its other terminal is connected to the stationary contact member 21 of a relay 22. One terminal of the winding 23 of the relay 22 is connected to one terminal of each of the resistors 19 and 20, the other terminals of which are connected to the conductors 1 and 2, respectively. The other terminal of the winding 23 is connected to a stationary contact member 24 and also to the common return conductor 3. The stationary contact members 21 and 24 of the relay 22 are adapted to be bridged by a movable contact member 25 when the sum of the voltage drops across the feeder conductors 1 and 2 and the return conductor 3 exceeds a predetermined value. Thus, the winding of the electromagnet 9 will be supplied with energy only when the relay 22 is closed.

Figure 5:
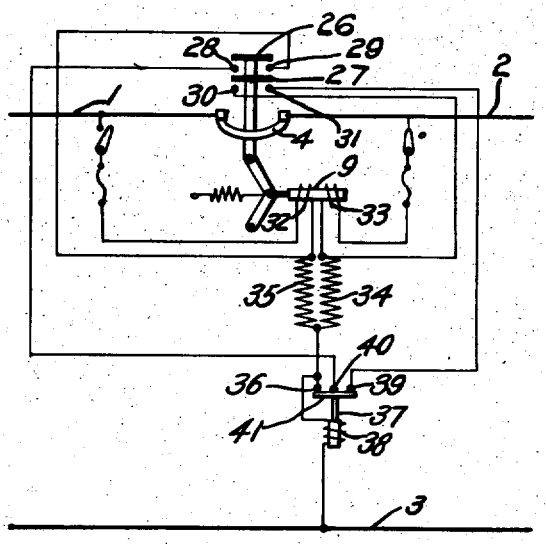

Since it is advisable to limit the current in the actuating winding of the circuit interrupter when the circuit interrupter is in its open and closed positions and to permit a maximum current to traverse the winding only when the interrupter is being closed, we provide the circuit interrupter 4, as shown in Fig. 5 of the drawings, with two auxiliary movable contact members 26 and 27 that are adapted to engage stationary contact members 28 and 29 and 30 and 31, respectively. The actuating electromagnet 9 comprises two windings 32 and 33. One terminal of the winding 33 is connected to the conductor 2 and the other terminal of the winding 33 is connected to one terminal of a resistor 34. One terminal of the winding 32 is connected to the conductor 1 and the other terminal of the winding 32 is connected to one terminal of a resistor 35. The other terminals of the resistors 34 and 35 are connected together and to the stationary contact member 36 of a relay 37. The stationary contact member 36 is also connected to one terminal of the winding 38 of the relay 37, the other terminal of which is connected to the conductor 3. The stationary contact member 31 of the circuit interrupter 4 is connected to the stationary contact member 39 of the relay 37 and the stationary contact member 28 of the circuit interrupter 4 is connected to the stationary contact member 40 of the relay 37. The stationary contact members 29 and 30 of the circuit interrupter 4 are connected to one terminal of the windings 32 and 33, respectively. The relay 37 is provided with a bridging contact member 41 that is adapted to engage the stationary contact members 36, 39 and 40 when the sum of the voltage drops across the feeder conductors 1 and 2 and the return conductor 3 exceeds a predetermined value.

As shown in Fig. 5 of the drawings, when the sum of the voltages is below a predetermined value, the windings 32 and 33 will not be sufficiently energized to hold the main contact members of the circuit interrupter 4 in their closed positions, and the resistors 34 and 35 will be connected in circuit with the respective windings of the actuating electromagnet 9. However, when the interrupter 4 is open, the bridging contact members 26 and 27 engage their respective stationary contact members in such manner that, when the relay 37 is again actuated, the resistors 34 and 35 will be short-circuited, and sufficient current will be permitted to traverse the windings 32 and 33 to close the interrupter 4. When the interrupter 4 is closed, the bridging contact members 26 and 27 are disengaged from their respective stationary contact members, and the short-circuit connections across the terminals of the resistors 34 and 35 are opened, thereby reducing the current that traverses the windings 32 and 33.

Figure 6:
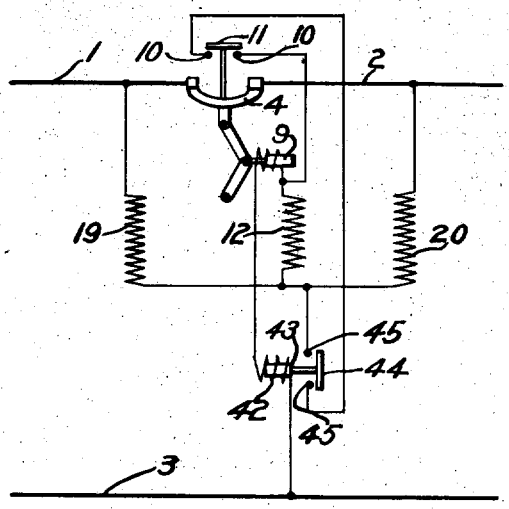

In Fig. 6 of the drawings, the electromagnet 9 is provided with a single winding, one terminal of which is connected to one terminal of the winding 42 of the relay 43 and the other terminal of the relay is connected to the conductor 3. The relay 43 is adapted to cause its movable bridging contact member 44 to engage its stationary contact members 45 for effecting a short-circuit connection around the terminals of the resistor 12 only when the interrupter 4 is open and the sum of the voltage drops across the feeder conductors 1 and 2 and the return conductor 3 exceeds a predetermined value. The interrupter 4 is provided with an auxiliary bridging contact member 11 and auxiliary stationary contact members 10 for opening the short-circuit connection as soon as the interrupter is closed, thereby reducing the current that traverses the winding of the electromagnet 9 when the interrupter is in its closed position.

Upon the occurrence of a short circuit or other abnormal condition on one section, the voltage reduces to a value insufficient to maintain the energization of the closing coil of the interrupter or of the potential relay controlling the circuit of the closing coil. The interrupter therefore opens and remains open until a predetermined average voltage is established between the two sections. The potential relay and the closing coil are thereupon energized sufficiently to close the interrupter. The sections are thus connected only while predetermined normal conditions obtain on the respective circuits.

The voltage available for operating or controlling the electromagnets 9 in the several forms of our invention, where such operating or controlling electromagnets are connected between the mid-points of the resistors 19 and 20 and the return conductor 3, is given by the following equation; wherein, $R_1$ represents the value in ohms of the resistor 19.

$R_2$ represents the value in ohms of the resistor 20.

$R_0$ represents the value in ohms of $R_1$ and $R_2$ when these values are equal.

$R_3$ represents the value in ohms of the resistance between the mid-point of resistor 19 and 20 and the return conductor 3.

$E_1$ represents the voltage drop from conductor 1 to the return conductor 3.

$E_2$ represents the voltage drop from conductor 2 to the return conductor 3.

$E_3$ represents the voltage drop between the mid-point of resistors 19 and 20 and the return conductor 3.

From Ohm's law:

$$\frac{E_3}{R_3}=\frac{E_1-E_3}{R_1}+\frac{E_2-E_3}{R_2}$$

Since;

$$R_1=R_2=R_0$$

$$\frac{E_3}{R_3}=\frac{E_1-E_3}{R_0}+\frac{E_2-E_3}{R_0}$$

$$\frac{E_3}{R_3}=\frac{E_1+E_2-2E_3}{R_0}$$

$$\frac{E_3}{R_3}=\frac{E_1+E_2}{R_0}-\frac{2E_3}{R_0}$$

$$\frac{E_3}{R_3}+\frac{2E_3}{R_0}=\frac{E_1+E_2}{R_0}=E_3\left(\frac{1}{R_3}+\frac{2}{R_0}\right)$$

$$E_3=\frac{E_1+E_2}{R_0\left(\frac{1}{R_3}+\frac{2}{R_0}\right)}$$

Hence;

$$E_3=\frac{E_1+E_2}{2+\frac{R_0}{R_3}}$$

Since $E_1+E_2$ is the sum of the potential drops from conductors 19 and 20 to the return conductor 3, and since $E_3$ is always equal to the sum $E_1+E_2$ divided by the value $$2+\frac{R_0}{R_3},$$

which is a constant for any given installation, it follows that the voltage $E_3$ always bears a definite ratio to the average, or the sum, of the potentials $E_1$ and $E_2$. The difference between the actual value of $E_3$ and the average value $$\frac{E_1+E_2}{2}$$

is dependent upon the ratio of $$\frac{R_0}{R_3}.$$

The selection of the proper ratio of $R_0$ to $R_3$ is a matter requiring the exercise of engineering skill for each installation of the system.

We do not limit our invention to the particular structures and arrangements illustrated, as it may be variously modified within the spirit and scope of the appended claims.

We claim as our invention:

1. In a system of distribution, the combination with two feeder conductors, a common return conductor, and a circuit interrupter for operatively connecting the feeder conductors together, of means actuated under all conditions, in accordance with the sum of the voltage drops between the respective feeder conductors and the return conductor for controlling the opening and closing of the circuit interrupter.

2. In a system of distribution, the combination with a circuit interrupter and an actuating electromagnet therefor, of a resistor, and means for so controlling the effectiveness of the resistor in the circuit that it limits the current traversing the electromagnet only when the interrupter is in its full-open and in its closed position.

3. A control circuit for a sectionalizing circuit interrupter between two adjacent section conductors of an electrical system provided with a common return conductor, comprising resistance means connected between the section conductors, an operating coil for the interrupter, means comprising a resistor for connecting the operating coil between a point of the resistance means and the common return conductor, and means controlled by the interrupter for controlling the effectiveness of the resistor.

4. The combination with two feeder conductors, a common return conductor, and a circuit interrupter for connecting the feeder conductors together, of an actuating electromagnet responsive, under all conditions, to the sum of the voltage drops between the feeder conductors and the return conductor for controlling the operation of the interrupter.

5. In a system of distribution, the combination with two feeder conductors, a common return conductor, and a circuit interrupter for operatively connecting the two feeder conductors together, of means for closing the interrupter and for holding it in its closed position, and means responsive, under all conditions, to the sum of the voltage drops between the two feeder conductors and the common return conductor for controlling the operation of the said closing and holding means.

6. In a system of distribution, the combination with two feeder conductors, a common return conductor, and a circuit interrupter operatively connecting the two feeder conductors together, of electromagnetic means for closing and holding the interrupter in its closed position, and means responsive, under all conditions, to the sum of the voltage drops across the two feeder conductors and the return conductor for so controlling the operation of the electromagnetic means that the interrupter will be held in its closed position only when the sum of the voltage drops exceeds a predetermined value.

7. In a system of distribution, the combination with two feeder conductors and a common return conductor, of a circuit interrupter responsive, under all conditions, to the sum of the voltage drops across the two feeder conductors and the return conductor for operatively connecting the feeder conductors together, under predetermined conditions.

8. In a system of distribution, the combination with two feeder circuits, of means responsive, under all conditions, to the sum of the voltage drops across the two circuits for operatively connecting the circuits together only when the sum of the voltage drops exceeds a predetermined value.

9. A control circuit for a sectionalizing circuit interrupter between two adjacent section conductors of an electrical system provided with a common return conductor, comprising resistance means connected between the section conductors, an operating coil for the interrupter, means comprising a resistor for connecting the operating coil between a point of the resistance means and the common return conductor, and means responsive to potential for controlling the effectiveness of the resistor.

10. A control circuit for a sectionalizing circuit interrupter between two adjacent section conductors of an electrical system provided with a common return conductor, comprising resistance means connected between the section conductors, an operating coil for the interrupter, means comprising a resistor for connecting the operating coil between a point of the resistance means and the common return conductor, means for short-circuiting the resistor and potential-responsive means for controlling the short-circuiting means.

11. The combination with two sections of an electrical circuit and an interrupter for controlling the connection between the two circuits, of two resistor elements connected between the two sections and an operating coil for the interrupter connected to the midpoint of the resistor elements.

12. A control circuit for a sectionalizing circuit interrupter between two adjacent section conductors of an electrical system provided with a common return conductor, comprising two resistance elements connected between the section conductors, an operating coil for the interrupter, and means comprising a resistor for connecting the operating coil between the junction of the resistance elements and the common return conductor.

13. A control circuit for a sectionalizing circuit interrupter between two adjacent section conductors of an electrical system provided with a common return conductor, comprising two resistance elements connected between the section conductors, an operating coil for the interrupter, means comprising a resistor for connecting the operating coil between the junction of the resistance elements and the common return conductor, and means for short-circuiting the resistor under predetermined conditions.

14. The combination with two sections of an electrical circuit and an interrupter for controlling the connection between the two circuits, of an operating coil therefor energized in accordance with the average of the values of the voltages of the two said sections.

15. An automatically reclosing sectionalizing circuit interrupter comprising a main contact member for connecting two sections when in closed position, mechanism for automatically closing said main contact member in response to voltage from either section, and means responsive to the average voltage of the two sections for controlling the operation of the closing mechanism.

16. An automatically reclosing sectionalizing circuit interrupter comprising a main contact member for connecting two sections when in closed position, mechanism for automatically closing said main contact member under predetermined voltage conditions in both sections, and means responsive to the average voltage of the sections for controlling the operation of the closing mechanism.

17. An automatically reclosing sectionalizing circuit interrupter comprising terminals by which connection is made to each of two sections, a main contact member, means for closing said main contact member to permit free passage of current from one section to the other, resistance means connected between said interrupter terminals to limit the passage of current from one section to the other when the main contact is in open position, and means for governing the closing means in response to a predetermined potential derived from the potentials of both sections through said resistance means.

18. A control circuit for a sectionalizing circuit interrupter between two adjacent section conductors of an electrical system provided with a common return conductor, comprising resistance means connected between the section conductors, an operating coil for the interrupter, and means comprising a resistor for connecting the operating coil between a point of the resistance means and the common return conductor.

19. A control circuit for a sectionalizing circuit interrupter between two adjacent section conductors of an electrical system provided with a common return conductor, comprising resistance means connected between the section conductors, an operating coil for the interrupter, means comprising a resistor for connecting the operating coil between a point of the resistance means and the common return conductor, and means for short-circuiting the resistor under predetermined conditions.

20. An automatically reclosing sectionalizing circuit interrupter comprising a main contact member for connecting two sections when in closed position and mechanism for automatically closing said main contact member in response to voltage from either section.

21. An automatically reclosing sectionalizing circuit interrupter comprising a main contact member for connecting two sections when in closed position, mechanism for automatically closing said main contact member in response to voltage from either section and means for precluding the actuation of such closing mechanism until the average voltage of both sections is a predetermined minimum value.

22. An automatically reclosing sectionalizing circuit breaker comprising a main contact member, two terminals to be bridged by said member, limiting resistance means to be connected between said terminals, an operating coil for closing said main contact member, means for opening said main contact member when abnormal conditions occur, means for precluding reclosure of said member until proper conditions exist, a coil governing said precluding means and means connecting said coil at substantially the center of said limiting resistance means.

23. An automatically reclosing sectionalizing breaker comprising a main contact member for connecting two sections, means for opening said contact member upon occurrence of abnormal conditions, means for automatically closing said contact member in response to a predetermined potential, and means whereby the closing means will be energized at the same potential by the two sections when one section is energized at one voltage and the other section at another voltage or vice versa.

24. A control circuit for a sectionalizing circuit interrupter between two adjacent sections of an electrical system provided with a common return conductor, comprising resistance means connected between the section conductors, an operating coil for the interrupter and means for connecting the operating coil between a point of such resistance means and the common return conductor.

25. An automatically reclosing sectionalizing switch comprising means for connecting two section conductors, an operating coil therefor, resistance means connected between the section conductors and means for controlling the energization of the operating coil in accordance with the potential difference between a predetermined point of the resistance means and a return conductor common to both sections.

26. An automatically reclosing sectionalizing switch for adjoining sections provided with a common return conductor, comprising a main contact member for joining the section conductors, an operating coil therefor, means connected between the section conductors for establishing a potential gradient between the conductors, and means for controlling the energization of the operating coil in accordance with the potential difference between a point of the gradient establishing means and the return conductor.

27. An automatically reclosing sectionalizing switch for adjoining sections provided with a common return conductor, comprising a main contact member for joining the section conductors, an operating coil therefor, and voltage means operative in response to a predetermined relation between the voltages of the two sections for controlling the energization of the operating coil.

28. An automatically reclosing sectionalizing switch for adjoining sections provided with a common return conductor, comprising a main contact member for joining the section conductors, an operating coil therefor, resistance means connected between the section conductors and means connected between a point of such resistance means and the common return conductor for controlling the energization of the operating coil.

29. An automatically reclosing sectionalizing switch for adjoining sections provided with a common return conductor, comprising a main contact member for joining the section conductors, an operating coil therefor, and means responsive to the voltages of both sections and to a predetermined relation between the values of such voltages for controlling the energization of the operating coil.

30. An automatically reclosing sectionalizing breaker comprising a main contact member to be placed between two sections, and mechanism for automatically closing said main contact member, when both sections are independently energized, in response to the averages of the potentials of the two sections at the opposite terminals of the breaker whether the potential on both sections are equal or not.

31. An automatically reclosing sectionalizing breaker comprising a main contact member for connecting adjacent sections and means for closing said member, and an electrical control for said closing means of such form that it will respond to a definite potential and will operate whenever a predetermined aggregate potential exists on the sections connected by the breaker regardless of whether one section is energized from another source or both in varying degrees.

32. An automatically reclosing sectionalizing breaker comprising a circuit breaker switch and operating mechanism therefor comprising a reclosing coil, a potential coil for rendering said reclosing coil effective, a limiting resistance element connecting adjacent sections, and a connection between the center of said resistance element and the opposite side of the line and running through said operating coil whereby said operating coil may be energized to close the breaker by current from either section.

33. An automatically reclosing sectionalizing circuit breaker comprising a main contact member, a coil for effecting automtic movement of said contact member into closed position, a means operative to subject said coil to a potential sufficient to close said member when line conditions are normal but operative after closure or when line conditions are abnormal and said member open, to subject said coil to a current of a value sufficient to maintain closure but less than that necessary to effect closure.

34. An automatically reclosing circuit breaker comprising a main contact member, a closing coil for effecting automatic movement of said contact member into closed position, means whereby the current in the closing coil is limited to a value sufficient to hold the main contact closed but insufficient to effect its closure from the open position, means whereby said limiting means is temporarily by-passed to permit the closing of the main contact, said means being responsive in opertaion to a predetermined potential.

35. An automatically reclosing sectionalizing switch for adjoining sections provided with a common return conductor, comprising a main contact member for joining the section conductors, an operating coil therefor, and means for controlling the energization of the operating coil in accordance with the potential gradient between the sections when the switch is in its open position.

36. An automatically reclosing sectionalizing switch for adjoining sections provided with a common return conductor, comprising a main contact member for adjoining the section conductors, an operating coil therefor, a resistor for connecting the sections when the main contact member is open, and controlling means for the operating coil energized by current traversing the resistor, whereby the resistor serves to establish a potential gradient across the open contactor and protect the controlling means from having excessive potentials impressed directly thereon.

In testimony whereof, we have hereunto subscribed our names this 1st day of October, 1921, and this 17th day of October, 1921, respectively.

JOSEPH N. MAHONEY.
WALTER M. AUSTIN.